(12) United States Patent
Jansen et al.

(10) Patent No.: US 8,349,968 B2
(45) Date of Patent: *Jan. 8, 2013

(54) METHOD FOR RADICALLY CURING

(75) Inventors: Johan Franz Gradus Antonius Jansen, Geleen (NL); Ronald Ivo Kraeger, Baarn (NL)

(73) Assignee: DSM IP Assets B.V., Heerlen (NL)

( * ) Notice: Subject to any disclaimer, the term of this patent is extended or adjusted under 35 U.S.C. 154(b) by 299 days.

This patent is subject to a terminal disclaimer.

(21) Appl. No.: 12/307,337

(22) PCT Filed: Jul. 5, 2007

(86) PCT No.: PCT/EP2007/005964
§ 371 (c)(1),
(2), (4) Date: Mar. 27, 2009

(87) PCT Pub. No.: WO2008/003499
PCT Pub. Date: Jan. 10, 2008

(65) Prior Publication Data
US 2009/0306305 A1 Dec. 10, 2009

(30) Foreign Application Priority Data
Jul. 6, 2006 (EP) .................................. 06014027

(51) Int. Cl.
*C08F 8/34* (2006.01)
(52) U.S. Cl. .............. 525/345; 525/11; 525/13; 525/23; 525/25; 525/245; 525/261; 525/263; 525/311; 525/329.5; 525/343; 525/350; 525/360; 525/374; 525/379; 525/383; 525/384; 525/451

(58) Field of Classification Search .................. 525/343, 525/345, 350, 360, 374, 379, 383, 384, 451, 525/11, 13, 23, 25, 329.5, 245, 261, 263, 525/311

See application file for complete search history.

(56) References Cited

U.S. PATENT DOCUMENTS

| 3,957,906 | A | * | 5/1976 | Buzbee et al. | ................... 525/40 |
| 5,310,826 | A | * | 5/1994 | Giovando | ..................... 525/438 |
| 5,310,856 | A | | 5/1994 | Li | |
| 6,194,525 | B1 | * | 2/2001 | Ortiz et al. | ....................... 525/42 |

FOREIGN PATENT DOCUMENTS

WO WO 2005/100436 * 10/2005

OTHER PUBLICATIONS 3-aminomethyl-3,5,5-trimethylcylcohexylamine, UEP OECD SIAR Publication, 2004.*
International Search Report for PCT/EP2007/005964, mailed Oct. 23, 2007.
Krämer, "Polyester Resins, Unsaturated," Wiley-VCH Verlag GmbH & Co. KGaA, Weinheim, 2005, pp. 1-10.

* cited by examiner

*Primary Examiner* — Robert C Boyle
(74) *Attorney, Agent, or Firm* — Nixon & Vanderhye P.C.

(57) ABSTRACT

The present invention relates to a method for radically curing an unsaturated polyester resin or vinyl ester resin composition, wherein the resin composition contains at least 10 ppm radical inhibitor; the resin composition has an acid value of from 0.001 to 300 mg KOH/g resin composition and the curing is effected in the presence of at least 5 mmol Mn/kg primary resin system and at least 10 mmol of thiol/kg primary resin system. The invention also relates to cured objects or structural parts obtained from a resin composition obtained by such a process.

19 Claims, No Drawings

METHOD FOR RADICALLY CURING

This application is the U.S. national phase of International Application No. PCT/EP2007/005964, filed 5 Jul. 2007, which designated the U.S. and claims priority to Europe Application No. 06014027.4, filed 6 Jul. 2006, the entire contents of each of which are hereby incorporated by reference.

The present invention relates to a method for radically curing an unsaturated polyester resin or vinyl ester resin composition containing at least 10 ppm radical inhibitor (relative to primary resin system).

Most commonly, in the state of the art, polymerization initiation of unsaturated polyester resins and vinyl ester resins is effected under the influence of peroxides. The polymerization initiation is most commonly accelerated or pre-accelerated by a cobalt compound in combination with another accelerator.

In the curing of unsaturated polyester resins and vinyl ester resins, gel time is a very important characteristic of the curing properties. In addition also the time from reaching the gel time to reaching peak temperature, and the level of the peak temperature (higher peak temperature generally results in better curing) are important. Apart from that, of course, also the mechanical properties of the objects and/or structural parts obtained in the curing process are important. As meant herein gel time represents the time lapsed in the curing phase of the resin to increase in temperature from 25° C. to 35° C. Normally this corresponds to the time the fluidity (or viscosity) of the resin is still in a range where the resin can be handled easily. In closed mould operations, for instance, this time period is very important to be known. Accordingly, the term good curing properties reflects, amongst other things, that the rein composition has suitable gel-time properties: i.e. the resin to be cured should remain sufficiently fluid for an acceptable time in the first stage of curing. For good curing properties it is important, that the gel time is rather short, i.e. in the order of some minutes to few tens of minutes. For reasons of process efficiency and results to be achieved, the skilled man accordingly will always try to find options to achieve a minimal gel time, while retaining good mechanical properties of the ultimately cured products. In addition, the skilled man also will try to find curable resin compositions having good storage stability, i.e. being stable (i.e. remain their handling properties without gellification) before being subjected to curing for at least one week after manufacture of the resin composition.

As meant herein the term gel-time drift (for a specifically selected period of time, for instance 30 or 60 days) reflects the phenomenon, that—when curing is performed at another point of time than at the reference standard moment for curing, for instance 24 hours after preparation of the resin—the gel time observed is different from that at the point of reference. For unsaturated polyester resins and vinyl ester resins, gel time represents the time lapsed in the curing phase of the resin to increase in temperature from 25° C. to 35° C. Normally this corresponds to the time the fluidity (or viscosity) of the resin is still in a range where the resin can be handled easily. In closed mould operations, for instance, this time period is very important to be known. The lower the gel-time drift is, the better predictable the behavior of the resin (and the resulting properties of the cured material) will be.

W. D. Cook et al. in Polym. Int. Vol. 50, 2001, at pages 129-134 describe in an interesting article various aspects of control of gel time and exotherm behavior during peroxide initiated cure of unsaturated polyester resins. They also demonstrate how the exotherm behavior during cure of such resins can be followed. FIGS. 2 and 3 of this article show the gel times in the bottom parts of the exotherms measured. Because these authors focus on the exotherms as a whole, they also introduced some correction of the exotherms for heat loss. As can be seen from the figures, however, such correction for heat loss is not relevant for gel times below 100 minutes.

Gel time drift (hereinafter: "Gtd") can be expressed in a formula as follows:

$$\text{Gtd} = (T_{25 \to 35° C. \text{ at } y\text{-days}} - T_{25 \to 35° C. \text{ after mixing}}) / T_{25 \to 35° C. \text{ after mixing}} \times 100\% \quad \text{(formula 1)}$$

In this formula $T_{25 \to 35° C.}$ (which also might be represented by $T_{gel}$) represents, as mentioned above, the time lapsed in the curing phase of the resin to increase in temperature from 25° C. to 35° C. The additional reference to "at y days" shows after how many days of preparing the resin the curing is effected.

All polyester resins, by their nature, undergo some changes over time from their production till their actual curing. One of the characteristics where such changes become visible is the gel-time drift. The state of the art unsaturated polyester resin or vinyl ester resin systems generally are being cured by means of initiation systems. In general, such unsaturated polyester resin or vinyl ester resin systems are cured under the influence of peroxides and are accelerated (often even pre-accelerated) by the presence of metal compounds, especially cobalt salts, as accelerators. Cobalt naphthenate and cobalt octanoate are the most widely used accelerators in combination with peroxides. However, for environmental reasons, the presence of cobalt in resin compositions is less preferred. In addition to accelerators, the polyester resins usually also contain radical inhibitors for ensuring that the resin systems do not gellify prematurely (i.e. that they have a good storage stability). Furthermore, radical inhibitors are being used to ensure that the resin systems have an appropriate gel time and/or for adjusting the gel-time value of the resin system to an even more suitable value. The amount of cobalt compound in the resin composition containing inhibitor is usually 0.1 to 5 mmol Co/kg resin. From W. D. Cook et al. in Polym. Int. Vol. 50, 2001, pages 129-134, FIGS. 8 and 9, it can be derived that, since cobalt is a catalyst, increasing the amount of cobalt compound above a certain level does not result in more efficient curing.

An excellent review article of M. Malik et al. in J.M.S.—Rev. Macromol. Chem. Phys., C40(2&3), p. 139-165 (2000) gives a good overview of the current status of resin systems. Curing is addressed in chapter 9. For discussion of control of gel time reference can be made to the article of Cook et al. as has been mentioned above. Said article, however, does not present any hint as to the problems of gel-time drift as are being solved according to the present invention.

The phenomenon of gel-time drift, indeed, so far got quite little attention in the literature. Most attention so far has been given in literature to aspects of acceleration of gel time in general, and to improving of pot-life or shelf life of resins via the addition of inhibitors. The latter aspects, however, are not necessarily correlated to aspects of gel-time drift, and so, the literature until now gives very little suggestions as to possible solutions for improvement of (i.e. lowering of) gel-time drift.

Accordingly, there is still a need for new curing systems for unsaturated polyester resins and vinyl ester resins.

The present inventors now, surprisingly, found that efficient curing of unsaturated polyester resin or vinyl ester resin compositions can be effected in the presence of at least 5 mmol Mn/kg primary resin system and at least 10 mmol of thiol/kg primary resin system.

In addition, resin systems with only slight gel-time drift tendency can be obtained.

The term "primary resin system" as used herein is understood to mean the total weight of the resin, but excluding any fillers as may be used when applying the resin system for its intended uses. The primary resin system therefore consists of the unsaturated polyester resin or vinyl ester resin, any additives present therein (except for the peroxide component that is to be added shortly before the curing) soluble in the resin, such as accelerators, promoters, inhibitors, low-profile agents, colorants (dyes), thixotropic agents, release agents etc., as well as styrene and/or other solvents as may usually be present therein. The amount of additives soluble in the resin usually may be as from 1 to 25 wt. % of the primary resin system; the amount of styrene and/or other solvent may be as large as up to 50 wt. % of the primary resin system. The primary resin system, however, explicitly does not include compounds not being soluble therein, such as fillers (e.g. glass or carbon fibers), talc, clay, solid pigments (such as, for instance, titanium dioxide (titanium white)), flame retardants, e.g. aluminum oxide hydrates, etc.

As used herein, with basic resin is meant the unsaturated polyester oligomeric resin or vinyl ester oligomeric resin as such.

It has surprisingly been found that with the method according to the invention efficient curing can be effected in the absence of a peroxide compound. This is advantageous in view of the fact that peroxides can accidentally initiate explosive polymerisation in materials with unsaturated chemical bonds, such as unsaturated polyester resins or vinyl ester resins. In addition, unsaturated polyester resin or vinyl ester resin systems with only slight gel-time drift can be obtained with the method of curing according to the invention.

In one embodiment of the present invention, a thiol-containing compound is added, in an amount of at least 10 mmol of thiol/kg primary resin system, to a resin composition containing unsaturated polyester resin or vinyl ester resin, at least 10 ppm inhibitor and at least 5 mmol Mn/kg primary resin system.

In another embodiment of the invention, a manganese compound is added, in an amount of at least 5 mmol Mn/kg primary resin system, to a resin composition containing unsaturated polyester resin or vinyl ester resin, at least 10 ppm inhibitor and at least 10 mmol of thiol/kg primary resin system.

U.S. Pat. No. 5,235,010 discloses an accelerator composition for the curing of unsaturated polyester resins comprising a complex of at least two salts of at least two different metals selected from the group consisting of lithium, magnesium, manganese, copper, cobalt, vanadium and iron, and an organic oxygen-containing compound capable of forming a metal complex with said metal salt including at least one functional group selected from the group consisting of an aldehyde, ketone, ether, ester or alcohol group. The curing is effected using conventional peroxide initiators known for use with unsaturated polyesters, such as for example methyl ethyl ketone peroxide or acetylacetone peroxide. Further, other materials including thiols and nitrogen-containing compounds may be present during the curing process. In Example 12 an unsaturated polyester resins is cured with methyl ethyl ketone peroxide or acetylacetone peroxide in the presence of an accelerator composition comprising manganese acetate, lithium chloride, diethyleneglycol, acetylacetone and a thiol adduct, There is no indication in this reference that curing can be achieved with a manganese compound and a thiol-containing compound in the absence of a peroxide. On the contrary, this reference teaches that adding manganese acetate (example 12) to an accelerator comprising lithium chloride and a thiol (example 11) results in an increased gel time, i.e. that Mn acts as a retarder.

U.S. Pat. No. 4,429,092 describes curing of vinyl ester resins in the presence of copper and tin polymerization promoters, a primary mercaptan chain transfer agent and peroxyester. There is no indication in this reference that curing can be achieved with a manganese compound and a thiol-containing compound in the absence of a peroxide. Moreover, in the experimental part, the use of manganese acetate (table 4) instead of copper and tin results in no curing at all.

The present invention also relates to unsaturated polyester resin or vinyl ester resin compositions containing at least 10 ppm inhibitor, at least 5 mmol Mn per kg primary resin system and the resin composition being curable with a thiol in an amount of at least 10 mmol of thiol per kg primary resin system.

The present invention also relates to unsaturated polyester resin or vinyl ester resin compositions containing at least 10 ppm inhibitor, at least 10 mmol thiol/kg primary resin system and the resin composition being curable with manganese in an amount of at least 5 mmol Mn/kg primary resin system.

The unsaturated polyester resin or vinyl ester resin may suitably be selected from the unsaturated polyester resins or vinyl ester resin as are known to the skilled man. Examples of suitable unsaturated polyester or vinyl ester resins are subdivided in the categories as classified by Malik et al., cited above.

(1) Ortho-resins: these are based on phthalic anhydride, maleic anhydride, or fumaric acid and glycols, such as 1,2-propylene glycol, ethylene glycol, diethylene glycol, triethylene glycol, 1,3-propylene glycol, dipropylene glycol, tripropylene glycol, neopentyl glycol or hydrogenated bisphenol-A. Commonly the ones derived from 1,2-propylene glycol are used in combination with a reactive diluent such as styrene.

(2) Iso-resins: these are prepared from isophthalic acid, maleic anhydride or fumaric acid, and glycols. These resins may contain higher proportions of reactive diluent than the ortho resins.

(3) Bisphenol-A-fumarates: these are based on ethoxylated bisphenol-A and fumaric acid.

(4) Chlorendics: are resins prepared from chlorine/bromine containing anhydrides or phenols in the preparation of the UP resins.

(5) Vinyl ester resins: these are resins, which are mostly used because of their because of their hydrolytic resistance and excellent mechanical properties, as well as for their low styrene emission, are having unsaturated sites only in the terminal position, introduced by reaction of epoxy resins (e.g. diglycidyl ether of bisphenol-A, epoxies of the phenol-novolac type, or epoxies based on tetrabromobisphenol-A) with (meth)acrylic acid. Instead of (meth)acrylic acid also (meth)acrylamide may be used.

Besides these classes of resins also so-called dicyclopentadiene (DCPD) resins can be distinguished as unsaturated polyester resins.

As used herein, a vinyl ester resin is a (meth)acrylate functional resin. Besides the vinyl ester resins as described in Malik et al., also the class of vinyl ester urethane resins (also referred to urethane methacylate resins) can be distinguished as vinyl ester resins. Preferably, the vinyl ester used in the present invention is a resin obtained by the esterification of an epoxy resin with (meth)acrylic acid or (meth)acrylamide.

All of these resins, as can suitably used in the context of the present invention, may be modified according to methods known to the skilled man, e.g. for achieving lower acid number, hydroxyl number or anhydride number, or for becoming more flexible due to insertion of flexible units in the backbone, etc. The class of DCPD-resins is obtained either by modification of any of the above resin types by Diels-Alder reaction with cyclopentadiene, or they are obtained alternatively by first reacting maleic acid with dicyclopentadiene, followed by the resin manufacture as shown above.

Of course, also other reactive groups curable by reaction with peroxides may be present in the resins, for instance reactive groups derived from itaconic acid, citraconic acid and allylic groups, etc. Accordingly, the unsaturated polyester resins or vinyl ester resins used in the present invention may contain solvents. The solvents may be inert to the resin system or may be reactive therewith during the curing step. Reactive solvents are particularly preferred. Examples of suitable reactive solvents are styrene, α-methylstyrene, (meth)acrylates, N-vinylpyrrolidone and N-vinylcaprolactam.

The unsaturated polyester resins and vinyl ester resins as are being used in the context of the present invention may be any type of such resins, but preferably are chosen from the group of DCPD-resins, iso-phthalic resins and ortho-phthalic resins and vinyl ester resins. More detailed examples of resins belonging to such groups of resins have been shown in the foregoing part of the specification. More preferably, the resin is an unsaturated polyester resin preferably chosen from the group of DCPD-resins, iso-phthalic resins and ortho-phthalic resins.

The resin composition generally contains less than 5 wt. % water

The resin composition according to the invention preferably has an acid value in the range of from 0.001-300 mg KOH/g of resin composition. As used herein, the acid value of the resin composition is determined titrimetrically according to ISO 2114-2000. In one embodiment, the resin composition comprising unsaturated polyester resin preferably has an acid value in the range of from 5-50 my KOH/g of resin composition. In another embodiment, the resin composition comprising vinyl ester resin preferably has an acid value in the range of from 0.3-130, more preferably lower than 100 and even more preferably lower than 50 mg KOH/g of resin composition. Preferably, the molecular weight of the basic unsaturated polyester resin or basic vinyl ester resin is in the range of from 500 to 200.000 g/mole. As used herein, the molecular weight of the resin is determined using gel permeation chromatography according to ISO 13885-1.

In the context of the invention the manganese of the curing system that is used in the present invention may come from all kinds of manganese compounds, Preferably, the manganese compound is a manganese salt or complex. More preferably, the manganese compound is a manganese$^{2+}$ salt or complex or a manganese$^{3+}$ salt or complex. Even more preferably, the manganese compound is a manganese$^{2+}$ salt or manganese$^{3+}$ salt. The manganese$^{2+}$ salt is preferably an organic manganese$^{2+}$ salt. The manganese$^{3+}$ salt is preferably an organic manganese$^{3+}$ salt. The organic manganese$^{2+}$ salt or the organic manganese$^{3+}$ salt is preferably a manganese carboxylate or a manganese acetoacetate. It will be clear that, instead of a single manganese compound also a mixture of manganese compounds can be used.

The curing is effected in the presence of at least 5 mmol Mn/kg primary resin system, preferably in the presence of at least 10 mmol Mn/kg primary resin system and more preferably in the presence of at least 20 mmol Mn/kg primary resin system. The upper limit of the manganese content is not very critical, although for reasons of cost efficiency of course no extremely high concentrations will be applied. Generally, the curing is effected in the presence of less than 200 mmol Mn per kg of primary resin system and preferably less than 100 mmol Mn per kg of primary resin system.

In the context of the invention, the thiol of the curing system that is used in the present invention may come from all kinds of thiol-containing compounds.

The thiol-containing compound is preferably an aliphatic thiol. The aliphatic thiol is preferably an α-mercapto acetate or β-mercapto propionate, or a derivative or mixture thereof. The thiol-functionality of the thiol-containing compound is preferably $\geqq 2$, more preferably $\geqq 3$.

The curing is effected in the presence of at least 10 mmol thiol/kg primary resin system, preferably in the presence of at least 30 mmol thiol/kg primary resin system and even more preferably in the presence of at least 50 mmol thiol/kg primary resin system. The upper limit of the thiol content is not very critical, although for reasons of cost efficiency of course no extremely high concentrations will be applied. Generally, the curing is effected in the presence of less than 500 mmol thiol per kg of primary resin system and preferably less than 200 mmol thiol per kg of primary resin system.

In a preferred embodiment of the invention, the curing according to the present invention is effected in the further presence of at least 3 mmol base/kg primary resin system. The additional presence of a base results in a more efficient curing, i.e. shorter gel time and/or higher peak temperature.

In one embodiment of the invention, the curing according to the present invention is effected in the presence of at least 10 mmol Mn/kg primary resin system and 10 mmol thiol/kg primary resin system and in the absence of a base. In another embodiment of the invention, the curing according to the present invention is effected in the presence of at least 5 mmol Mn/kg primary resin system, 10 mmol thiol/kg primary resin system and at least 3 mmol base/kg primary resin system.

Preferably, the base is an organic base with $pK_a \geqq 10$ or the base is an alkali metal or earth alkali metal compound. More preferably, the base is an alkali metal or earth alkali metal compound. The organic base with $pK_a \geqq 10$ is preferably a nitrogen containing compound, preferably an amine, more preferably a tertiary amine. The alkali metal or earth alkali metal compound is preferably an oxide, hydroxide, carboxylate, carbonate or hydrocarbonate. Preferably, the alkali metal is not lithium and the earth alkali metal is not magnesium in view of the low solubility of lithium and magnesium compounds in the resin composition. Most preferably, the base is a potassium compound. The potassium compound is preferably a potassium carboxylate, preferably a potassium $C_6$-$C_{20}$ carboxylate. In a preferred embodiment of the present invention, the potassium carboxylate is in-situ formed by adding potassium hydroxide to the resin composition.

In the present invention, the molar ratio between manganese and thiol groups of the thiol containing compound is preferably from 10:1 to 1:80, more preferably from 1.5:1 to 1:8. The molar ratio between manganese and the basic functionality of the base is preferably from 100:1 to 1:30, more preferably form 4:1 to 1:1.5. The molar ratio between the basic functionality and the thiol groups is preferably from 8:1 to 1:140, more preferably from 1:1 to 1:11.

In a preferred embodiment of the invention, the resin composition also contains one or more reactive diluents. Preferably in an amount of at least 5 weight %.

Such reactive diluents are especially relevant for reducing the viscosity of the resin in order to improve the resin handling properties, particularly for being used in techniques like vacuum injection, etc. However, the amount of such reactive diluent in the resin composition according to the invention is not critical. Preferably, the reactive diluent is a methacrylate and/or styrene.

The resin composition contains at least one radical inhibitor in an amount of at least 10 ppm, preferably at least 50 ppm and more preferably at least 100 ppm. Preferably, the amount of inhibitor in the resin composition is at most 10000 ppm, more preferably at most 1000 ppm. Preferably, the one or more inhibitors are selected from the groups of phenolic compounds like for example phenols, hydroquinones and catechols; stable radicals like galvinoxyl and N-oxyl based compounds; and/or phenothiazines.

Suitable examples of radical inhibitors that can be used in the resin compositions are, for instance, 2-methoxyphenol, 4-methoxyphenol, 2,6-di-t-butyl-4-methylphenol, 2,6-di-t-butylphenol, 2,4,6-trimethyl-phenol, 2,4,6-tris-dimethylaminomethyl phenol, 4,4'-thio-bis(3-methyl-6-t-butylphenol), 4,4'-isopropylidene diphenol, 2,4-di-t-butylphenol, 6,6'-di-t-butyl-2,2'-methylene di-p-cresol, hydroquinone, 2-methyl-hydroquinone, 2-t-butylhydroquinone, 2,5-di-t-butylhydroquinone, 2,6-di-t-butylhydroquinone, 2,6-dimethylhydroquinone, 2,3,5-trimethylhydroquinone, catechol, 4-t-butylcatechol, 4,6-di-t-butylcatechol, benzoquinone, 2,3,5,6-tetrachloro-1,4-benzoquinone, methylbenzoquinone, 2,6-dimethylbenzoquinone, napthoquinone, 1-oxyl-2,2,6,6-tetramethylpiperidine, 1-oxyl-2,2,6,6-tetramethylpiperidine-4-ol (a compound also referred to as TEMPOL), 1-oxyl-2,2,6,6-tetramethylpiperidine-4-one (a compound also referred to as TEMPON), 1-oxyl-2,2,6,6-tetramethyl-4-carboxyl-piperidine (a compound also referred to as 4-carboxy-TEMPO), 1-oxyl-2,2,5,5-tetramethylpyrrolidine, 1-oxyl-2,2,5,5-tetramethyl-3-carboxylpyrrolidine (also called 3-carboxy-PROXYL), aluminium-N-nitrosophenyl hydroxylamine, diethylhydroxylamine, phenothiazine and/or derivatives or combinations of any of these compounds.

In specifically preferred embodiments of the invention, the curing is effected essentially free of cobalt. Essentially free of cobalt means that the cobalt concentration is lower than 0.01 mmol Co per kg primary resin system, preferably lower than 0.001 mmol Co per kg primary resin system. Most preferably the process is effected in the absence of cobalt.

In another preferred embodiment the curing is performed in the absence of peroxide. In another preferred embodiment, the curing is effected in the absence of LiCl.

The unsaturated polyester resin or vinyl ester resin composition according to the present invention can be applied in all applications as are usual for such types of resins. In particular they can suitably used in closed mould applications, but they also can be applied in open mould applications, For closed mould applications it is especially important that the manufacturer of the closed mould products reliably can use the favorable (i.e. reduced) gel-time drift tendency of the resin compositions according to the invention. End segments where the unsaturated polyester resin or vinyl ester resin compositions according to the present invention can be applied are also marine applications, chemical anchoring, roofing, construction, relining, pipes & tanks, flooring, windmill blades, etc. That is to say, the resin compositions according to the invention can be used in all known uses of unsaturated polyester resins and vinyl ester resins.

The present invention further also relates to all such objects or structural parts as are being obtained when curing the unsaturated polyester resin or vinyl ester resin compositions according to the invention. These objects and structural parts have excellent mechanical properties. As meant herein, objects and structural parts are considered to have a thickness of at least 0.5 mm and appropriate mechanical properties. The term "objects and structural parts" as meant herein also includes cured resin compositions as are used in the field of chemical anchoring, construction, roofing, flooring, windmill blades, containers, tanks, pipes, automotive parts, boats, etc.

The invention is now demonstrated by means of a series of examples and comparative examples. All examples are supportive of the scope of claims. The invention, however, is not restricted to the specific embodiments as shown in the examples.

Experimental Part

The resins used for curing are commercially available products from DSM Composite Resins B.V., Schaffhausen, Switzerland except when explicitly noted and in addition thereto also a resin—hereinafter referred to as Resin A—was specifically prepared on behalf of the inventors for being used in the tests.

Preparation of Resin A 184.8 g of propylene glycol (PG), 135.8 g of diethylene glycol (DEG), 216.1 g of phthalic anhydride (PAN), 172.8 g of maleic anhydride (MAN), and 0.075 g t-butyl-hydroquinone were charged in a vessel equipped with a reflux condenser, a temperature measurement device and inert gas inlet. The mixture was heated slowly by usual methods to 205° C. At 205° C. the mixture was kept under reduced pressure until the acid value reached a value below 16 mg KOH/g resin and the falling ball viscosity at 100° C. was below 50 dPa·s. Then the vacuum was relieved with inert gas, and the mixture was cooled down to 130° C., and thereafter the solid UP resin so obtained was transferred to a mixture of 355 g of styrene and 0.07 g of mono-t-butyl-hydroquinone and was dissolved at a temperature below 80° C. The final resin viscosity reached at 23° C. was 640 mPa·s, and the Non Volatile Matter content was 64.5 wt. %. The resulting acid value was 10 mg KOH/g resin.

Monitoring of Curing

In most of the Examples and Comparative Examples presented hereinafter it is mentioned, that curing was monitored by means of standard gel time equipment. This is intended to mean that both the gel time ($T_{gel}$ or $T_{25 \to 35° C.}$) and peak time ($T_{peak}$ or $T_{25 \to peak}$) were determined by exotherm measurements according to the method of DIN 16945 when curing the resin with the peroxides as indicated in the Examples and Comparative Examples. The equipment used therefore was a Soform gel timer, with a Peakpro software package and National Instruments hardware; the waterbath and thermostat used were respectively Haake W26, and Haake DL30.

For some of the Examples and Comparative Examples also the gel-time drift (Gtd) was calculated.
This was done on the basis of the gel times determined at different dates of curing according to formula 1:

$$Gtd = (T_{25 \to 35° C. \text{ at } y\text{-days}} - T_{25 \to 35° C. \text{ after mixing}}) / T_{25 \to 35° C. \text{ after mixing}} \times 100\% \quad \text{(formula 1)}$$

with "y" indicating the number of days after mixing.

Examples 1a-1f and Comparative Experiment A-D

Formulation were prepared based on 100 g resin A containing 145 ppm radical inhibitor, x g Mn ethylhexanoate solution (6% Mn), y g K octanoate solution in PEG (15%) and cured at 25° C. with z g thiol (pentaerythritol tetrakis(3- mercaptopropionate), 4-SH, commercially available from Bruno Bock Chemische Fabrik GmbH & Co.)). The cure was monitored using the gel time equipment described above and the results are shown in table 1.

$T_{gel}$=5.1 min, $T_{cure}$=10.7 min and peak temp=113° C. The resulting gel time drift was −2%.

This example demonstrates that drift free resins can be obtained using this cure system. Furthermore it demonstrates that thiol-containing resins can be cured using Mn compounds, which illustrates the versatility of the cure system. Moreover it demonstrates that radical inhibitors can be employed together with the cure system according to the invention.

TABLE 1

|  | x g Mn (mmol Mn/kg primary resin system) | y g K-oct (mmol K-oct/kg primary resin system) | z g thiol (mmol thiol groups/kg primary resin system) | Tgel (min) | T peak (min) | peak temp (° C.) |
|---|---|---|---|---|---|---|
| 1a | 3 (33) | 0 | 1.5 (123) | 1.8 | 4.2 | 139 |
| Comp Exp A | 0.25 (2.7) | 0 | 1.5 (123) | >1200 | | |
| Comp Exp B | 0.5 (5.4) | 0 | 1.5 (123) | >1200 | | |
| Comp Exp C | 0.75 (8.2) | 0 | 1.5 (123) | >1200 | | |
| Comp Exp D | 0.6 (6.5) | 0 | 1 g butyl mercaptane (111) | >1200 | | |
| 1b | 0.5 (5.4) | 0.1 (3.9) | 1.5 (123) | 3.3 | 5.8 | 37 |
| 1c | 1.75 (19.1) | 0.8 (30.7) | 1 (82) | 1.1 | 5.9 | 60 |
| 1d | 3 (33) | 0.1 (3.9) | 0.5 (41) | 1.7 | 4.4 | 105 |
| 1e | 3 (33) | 1.5 (58) | 0.5 (41) | 0.8 | 5.6 | 103 |
| 1f | 3 (33) | 0.1 (3.9) | 1.5 (123) | 1.0 | 3.4 | 141 |

These experiment indicate that in the absence of a basic compound at least 9 mmol Mn/kg resin is required for an efficient curing using thiol. Furthermore these experiments demonstrate that in case a basic compound is added, efficient curing takes place with at least 5 mmol/kg resin.

Examples 2a and 2b

A formulation was prepared using 1200 g Palatal P 6-01, 155 g Styrene, 0.3 g t butyl catechol and 22.8 g pentaerythritol tetrakis(3-mercaptopropionate) (4-SH). 2 portions of 100 g were taken. The first was cured immediately after mixing using 3 g Nuodex Mn 10 (10% Mn in spirits, commercially available from Elementis) resulting in the following cure characteristics $T_{gel}$=5.2 min, $T_{cure}$=11 min and peak temperature=116° C.

After 27 days the second portions was cured using 3 g Nuodex Mn 10 resulting in the following cure characteristics Examples 3a-3h The following formulation were prepared and cured with Nuodex Mn 10 (10% Mn solution in spirits).

TABLE 2

| | Example | | | | | | | |
|---|---|---|---|---|---|---|---|---|
| | 3a | 3b | 3c | 3d | 3e | 3f | 3g | 3h |
| Resin | Daron XP-45-A-2 | Daron XP-45-A-2 | A | Palatal 6-01 | Palatal 6-01 | Palatal 4-01 | Palatal 4-01 | Synolite 8388-N-1 |
| Total inhibitor content (ppm) | 250 | 250 | 145 | 110 | 110 | 110 | 110 | 70 |
| Acid Value (mg KOH/g) | 4 | 4 | 10 | 30 | 30 | 30 | 30 | 20 |
| amount resin (g) | 100 | 100 | 100 | | | 100 | 94 | 50 |
| Styrene (g) | | | 1 | | | | 3 | |
| K-octanoate (g) | 0.52 | | 0.5 | | | | | |
| 4-SH (g) | 0.5 | 2 | 0.5 | | | 2 | | 1 |
| Dodecylmercaptane (g) | | | | 2.49 | | | | |
| Mercaptopropyltriethoxysilane (g) | | | | | 2.38 | | | |
| 2-mercaptobenzothiazole (g) | | | | | | | 1 | |
| Nuodex Mn 10 (g) | 1.72 | 3 | 1.64 | 3 | 3 | 3 | 2 | 1.5 |
| gel-time (min) | 9.6 | 8.4 | 0.6 | 2.5 | 2.4 | 2.0 | 2.2 | 1.1 |
| peak time (min) | 17.2 | 14.6 | 4.1 | 6.1 | 6.1 | 5.8 | 5.9 | 3.9 |
| peak temp (° C.) | 107 | 131 | 115 | 95 | 106 | 90 | 81 | 81 |

These examples clearly demonstrate orthophthalic polyester resins, DCPD resins as well as vinyl esters can be used. Moreover they demonstrate that multiple thiol compounds can be used. However 4-SH is preferred as this compound has almost no odour.

Examples 4a-4c

The following formulations (all amounts are in grams) based on SR214 (VE resin obtained from Cray valley) containing 300 ppm methoxyphenol were prepared and cured with Nuodex Mn10.

TABLE 3

|  | 4a | 4b | 4c |
|---|---|---|---|
| Resin | 100 | 100 | 100 |
| 4-SH | 2.04 | 2.00 | 2.00 |
| methacrylic acid |  | 2.00 |  |
| maleic acid |  |  | 1.01 |
| Acid value | 0.3 | 130 | 96 |
| Nuodex Mn-10 | 3.01 | 2.99 | 3.00 |
| gel time (min) | 55 | 19 | 1.3 |
| peak time (min | 60 | 24 | 3.5 |
| Peak temp (° C.) | 121 | 191 | 135 |

These examples demonstrate that the curing can be tuned via the addition of acidic components.

Examples 5a-5c and Comparative Experiment e

To 100 g Atlac E-NOVA FW 2045, a vinyl ester resin with an acid value of 5 mg KOH/g primary resin system, which contains 140 ppm of a mixture of phenolic inhibitors, was added x g 4-SH (as defined above) followed by Y g Nuodex Mn10 (10% solution in spirits). The results are shown in the next table.

TABLE 4

|  | g thiol (mmol thiol groups/kg primary resin system) | g Mn (mmol/kg primary resin system) | Tgel (min) | T peak (min) | peak temp (° C.) |
|---|---|---|---|---|---|
| 5a | 2 (164) | 3 (54) | 9.3 | 17.4 | 170 |
| 5b | 1 (82) | 1.5 (27) | 10.9 | 21.3 | 139 |
| 5c (a with 80 ppm t-butylcatechol) | 2 (164) | 3 (54) | 13.6 | 25.8 | 154 |
| Comp Exp E | 1.2 (100) | 0.36 (6.4) | >1200 |  |  |

These results indicate that the curing can be tuned with the amount of Mn and thiol. Furthermore these results indicate that the curing can be controlled in a better fashion via the addition of radical inhibitors.

Example 6

500 g Atlac E-NOVA FW 2045, a resin with an AV=5 mg KOH/g that contains 140 ppm of a mixture of phenolic inhibitors was cured with a manganese/thiol system according to the formulation described in the next table. All amounts are in grams. The mechanical properties, of which the results are shown below were determined after a postcure of 24 hrs at 60° C. and 24 hrs at 80° C. Mechanical properties of the cured objects were determined according to ISO 527-2. The Heat Distortion Temperature (HDT) was measured according to ISO 75-Ae, Barcol hardness was measured according to DIN EN 59.

TABLE 5

|  | Manganese-thiol (6a) | Comparative experiment (6comp) |
|---|---|---|
| 4-SH | 10.01 |  |
| Nuodex Mn10 | 15.00 |  |
| t-butyl catechol, 10% in styrene | 0.25 |  |
| Accelerator NL 49P |  | 15.00 |
| Butanox M-50 ((a MEK peroxide solution, commercially available from Akzo Nobel Chemicals Inc.) |  | 10.00 |
| Tensile strenght (MPa) | 89.8 | 83.2 |
| E-modulus (MPa) | 3528 | 3553 |
| Elongation at break (%) | 4.0 | 3.3 |
| HDT (° C.) | 136 | 128 |
| Barcol hardness | 47 | 46 |

These results clearly demonstrate that excellent mechanical properties compared to a cobalt MEK peroxide system can be obtained with a manganese thiol cure system according to the invention.

The invention claimed is:

1. A method for radically curing an unsaturated polyester resin or vinyl ester resin composition, comprising:
   (i) providing a resin composition comprising an unsaturated polyester resin or vinyl ester resin, at least 10 ppm radical inhibitor, one or more reactive diluent and having an acid value of from 0.001 to 300 mg KOH/g of the resin composition, wherein the reactive diluent is a methacrylate and/or styrene, and
   (ii) curing the resin composition in the absence of peroxide, but in the presence of at least 20 mmol Mn/kg of primary resin system and a thiol-containing compound providing at least 10 mmol of thiol/kg of primary resin system and less than 500 mmol thiol/kg of primary resin system, wherein the molar ratio between manganese and thiol groups of the thiol-containing compound is from 1.5:1 to 1:8, and wherein the primary resin system consists of the unsaturated polyester resin or vinyl ester resin, any additive present in the resin composition that is soluble in the resin and any solvent present in the resin composition.

2. The method according to claim 1, wherein the inhibitor is chosen from the group of phenolic compounds, stable radicals, catechols and/or phenothiazines.

3. The method according to claim 1, wherein the amount of inhibitor in the resin composition is in the range from 0.0001 to 10% by weight, calculated on the total weight of the primary resin system.

4. The method according to claim 1, wherein Mn originates from a manganese carboxylate compound or a manganese acetoacetate compound.

5. The method according to claim 1, wherein the thiol-containing compound is an aliphatic thiol.

6. The method according to claim 5, wherein the aliphatic thiol is an α-mercapto acetate or β-mercapto propionate, or a derivative or mixture thereof.

7. The method according to claim 1, wherein the thiol-functionality of the thiol-containing compound in the resin composition is ≧2.

8. The method according to claim 1, wherein the curing is effected in the further presence of at least 3 mmol base/kg of the primary resin system.

9. The method according to claim 8, wherein the base is an organic base with pKa ≧10 or the base is an alkaline metal or earth alkaline metal compound.

10. The method according to claim 9, wherein the organic base with pKa ≧10 is a nitrogen-containing compound.

11. The method according to claim 8, wherein the base is an alkaline metal or earth alkaline metal compound.

12. The method according to claim 1, wherein the curing is effected essentially free of cobalt.

13. The method according to claim 1, wherein the curing is effected in the absence of LiCl.

14. Cured objects or structural parts obtained from a resin composition obtained by a process according to claim 1.

15. The method according to claim 1, wherein the thiol-functionality of the thiol-containing compound in the resin composition is $\geq 3$.

16. The method according to claim 9, wherein the nitrogen-containing compound is an amine.

17. The method according to claim 16, wherein the amine is a tertiary amine.

18. The method according to claim 11, wherein the base is a potassium carboxylate.

19. The method according to claim 1, wherein Mn originates from a manganese carboxylate or a manganese acetoacetate.

* * * * *